United States Patent
Nishiguchi et al.

(10) Patent No.: US 10,287,405 B2
(45) Date of Patent: *May 14, 2019

(54) CROSSLINKED RESIN MOLDED BODY, CROSSLINKABLE RESIN COMPOSITION, METHOD OF PRODUCING THESE, SILANE MASTER BATCH, AND MOLDED ARTICLE

(71) Applicant: FURUKAWA ELECTRIC CO., LTD., Tokyo (JP)

(72) Inventors: Masaki Nishiguchi, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,290

(22) Filed: Jul. 5, 2018

(65) Prior Publication Data

US 2018/0312646 A1 Nov. 1, 2018

Related U.S. Application Data

(63) Continuation of application No. 15/480,752, filed on Apr. 6, 2017, now Pat. No. 10,040,913, which is a continuation of application No. PCT/JP2015/078683, filed on Oct. 8, 2015.

(30) Foreign Application Priority Data

Oct. 8, 2014 (JP) ................................. 2014-207602

(51) Int. Cl.
| | | |
|---|---|---|
| C08K 3/22 | (2006.01) | |
| C08J 3/22 | (2006.01) | |
| C08J 3/24 | (2006.01) | |
| C08K 5/14 | (2006.01) | |
| C08K 5/5425 | (2006.01) | |
| B29B 7/02 | (2006.01) | |
| B29B 7/90 | (2006.01) | |
| B29C 35/02 | (2006.01) | |
| B29C 47/00 | (2006.01) | |
| C08K 3/26 | (2006.01) | |
| C08K 3/36 | (2006.01) | |
| B29B 7/00 | (2006.01) | |
| B29B 7/74 | (2006.01) | |
| C08L 23/04 | (2006.01) | |
| H01B 3/44 | (2006.01) | |
| C08L 23/00 | (2006.01) | |
| B29K 105/16 | (2006.01) | |
| B29L 7/00 | (2006.01) | |

(52) U.S. Cl.
CPC ............... *C08J 3/22* (2013.01); *B29B 7/005* (2013.01); *B29B 7/007* (2013.01); *B29B 7/02* (2013.01); *B29B 7/7495* (2013.01); *B29B 7/90* (2013.01); *B29C 35/02* (2013.01); *B29C 47/0004* (2013.01); *B29C 47/0021* (2013.01); *C08J 3/24* (2013.01); *C08K 3/22* (2013.01); *C08K 3/26* (2013.01); *C08K 3/36* (2013.01); *C08K 5/14* (2013.01); *C08K 5/5425* (2013.01); *C08L 23/00* (2013.01); *C08L 23/04* (2013.01); *H01B 3/44* (2013.01); *B29C 47/0009* (2013.01); *B29K 2105/16* (2013.01); *B29L 2007/002* (2013.01); *C08J 2323/06* (2013.01); *C08K 2003/2224* (2013.01); *C08K 2003/2227* (2013.01); *C08K 2003/265* (2013.01); *C08L 2312/00* (2013.01)

(58) Field of Classification Search
CPC .................................. C09K 21/14; C08J 3/24
See application file for complete search history.

(56) References Cited

U.S. PATENT DOCUMENTS

| | | | |
|---|---|---|---|
| 6,107,413 A | 8/2000 | Mori | |
| 2014/0227518 A1 | 8/2014 | Kishimoto et al. | |

FOREIGN PATENT DOCUMENTS

| | | |
|---|---|---|
| JP | 2000-143935 | 5/2000 |
| JP | 2000-315424 | 11/2000 |
| JP | 2001-101928 | 4/2001 |
| JP | 2001-240719 | 9/2001 |
| WO | WO 2013/147148 A1 | 10/2013 |
| WO | WO 2014/084047 A1 | 6/2014 |

OTHER PUBLICATIONS

International Search Report dated Jan. 12, 2016 in PCT/JP2015/078683 filed on Oct. 8, 2015 (with English translation).
"Products, Magnesium Hydroxide, Kyowa Chemical Industry Co. Ltd.", http://kyowa-chem.jp/products/ind_material02.html, 2014, 2 pgs.

*Primary Examiner* — Peter D. Mulcahy
(74) *Attorney, Agent, or Firm* — Oblon, McClelland, Maier & Neustadt, L.L.P.

(57) ABSTRACT

A production method, containing the step of: mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin, in which the inorganic filler has an X value specified by Formula (I) satisfies 5 to 1050, $$X = \Sigma A/B \quad \text{Formula (I)}$$

wherein, ΣA denotes a total amount of a product of a BET specific surface area (m$^2$/g) of the inorganic filler and a blending amount of the inorganic filler, and B denotes a blending amount of the silane coupling agent; and a crosslinkable resin composition and a crosslinked resin molded body produced by the production method; and a silane master batch and a molded article.

9 Claims, No Drawings

CROSSLINKED RESIN MOLDED BODY, CROSSLINKABLE RESIN COMPOSITION, METHOD OF PRODUCING THESE, SILANE MASTER BATCH, AND MOLDED ARTICLE

CROSS-REFERENCE TO RELATED APPLICATIONS

This application is a continuation of Ser. No. 15/480,752, filed on Apr. 6, 2017, in which a continuation of PCT/JP2015/078683 filed on Oct. 8, 2015 which claims benefit of Japanese Patent Application No. 2014-207602 filed on Oct. 8, 2014, the subject matters of which are incorporated herein by reference in their entirety.

TECHNICAL FIELD

The present invention relates to a crosslinked resin molded body, a crosslinkable resin composition, and methods of producing them, respectively, a silane master batch, as well as a molded article. Specifically, the present invention relates to a crosslinked resin molded body excellent in appearance, mechanical characteristics and heat resistance and a method of producing the same, a silane master batch and a crosslinkable resin composition, capable of forming the crosslinked resin molded body having excellent in such properties and a method of the crosslinkable resin composition, as well as molded articles such as an electric wire, a rubber grommet, a rubber hose or vibration-proof rubber each using the crosslinked resin molded body as an insulator or a sheath.

BACKGROUND ART

Rubber products such as an electric wire, a rubber hose (also referred to as a rubber tube), a tire, a grommet or a vibration-proof rubber have been widely used as each member for which physical properties or characteristics such as mechanical characteristics, flexibility, elasticity, repellency, and permanent compressibility are required. As a rubber material from which these rubber products are formed, a wide range of rubber materials such as ethylene-propylene-diene rubber (EPDM), styrene-butylene rubber (SBR), nitrile-butylene rubber (NBR), and fluorine-containing rubber have been used. Moreover, a crosslinked polyethylene material has been widely used as a coating material or a member for various cables by taking advantage of heat resistance thereof.

These rubber materials and crosslinked polyethylene are produced into the rubber product as described below. More specifically, a crosslinking agent such as organic peroxide and a phenolic compound is previously blended into rubber, and the resultant blend is molded in a state in which these crosslinking agents do not sufficiently react therewith. Then, a crosslinked molded body having rubber elasticity and flexibility is obtained by heating the non-crosslinked molded body to cause crosslinking, and cooling the resultant material. For example, in a case where the electric wire is continuously produced, the rubber material or the like is molded at a low temperature of 120° C. or lower and in this state, for example, passed through a vulcanization pipe warmed by water vapor or the like to cause crosslinking, and the resultant material is further passed through a cooling pipe cooled by water or the like.

Thus, in a case where the rubber material or the crosslinked polyethylene as described above is used, upon molding these rubber materials or the like, it is required to mold the materials at a temperature at which the crosslinking agents cause no reaction, and then sufficiently heat the molded material at a temperature at which the crosslinking agents are decomposed to cause reaction, while keeping the molded state, to progress crosslinking, and to cool the resultant material. Therefore, a long period of time is required for production thereof.

Moreover, usually, the rubber material or the like should be molded at the temperature at which the crosslinking agents cause no reaction, which has posed a problem of difficulty in molding the material by a specific method such as injection molding.

As a method of solving these problems, proposals have been made on a method of dynamically crosslinking, by using organic peroxide through metal hydrate subjected to silane surface treatment, a vinyl aromatic thermoplastic elastomer composition prepared by using a thermoplastic elastomer, or a block copolymer described in Patent Literatures 1 to 3, or the like as a base resin, and adding a softener for non-aromatic rubber as a softener. However, while these thermoplastic elastomers have flexibility, these elastomers are melted at a high temperature, and therefore are unable to be used as the rubber product.

Incidentally, specific examples of a method of crosslinking a polyolefin-based resin such as polyethylene include an electron beam crosslinking method using an electron beam, and a silane crosslinking method.

However, in the electron beam crosslinking method, not only cost for facilities is significantly high, but also a thickness of the molded body which can be produced is restricted, and therefore such a method is unable to be applied for the various rubber products. On the other hand, the silane crosslinking method is a method of obtaining a crosslinked molded body, by a grafting reaction of a silane coupling agent onto a polymer in the presence of organic peroxides, to obtain a silane graft polymer, and then contacting the silane graft polymer with water in the presence of a silanol condensation catalyst. This silane crosslinking method requires no special facilities in many cases. Accordingly, among the above-described crosslinking methods, the silane crosslinking method has been particularly applied in a wide range of fields.

Usually, in a case where a filler is mixed with a resin, a Banbury mixer, a kneader mixer or a twin screw extruder is used. However, if the kneader or the Banbury mixer is used in a case where the resin containing the filler is crosslinked by the silane crosslinking method, a silane coupling agent is volatized before a silane grafting reaction because of high volatility. Therefore, it becomes difficult to prepare a silane master batch containing a silane graft polymer and the filler. Moreover, also in a case where the twin screw extruder is used, problems of difficulty in resin pressure control and easily causing foaming remain.

Therefore, in the case of preparing a silane master batch with a Banbury mixer or a kneader, consideration might be given to a method which includes adding a silane coupling agent to a master batch prepared by melt-mixing polyolefin and an inorganic filler such as a flame retardant or reinforcement material, and then subjecting the resultant to the silane coupling agent is reacted onto polyolefin so as to form a graft in a single-screw extruder. However, this method may cause poor appearance. Moreover, if an antidegradant is incorporated into the master batch, inhibition of the silane grafting reaction is caused, and desired heat resistance is unable to be obtained in several cases.

As another method, Patent Literature 4 describes a method in which an inorganic filler surface-treated with a silane coupling agent, a silane coupling agent, an organic peroxide, and a crosslinking catalyst are melt-kneaded with olefin-based resin using a kneader, and then the blend is molded using a single-screw extruder. However, according to the method described in Patent Literature 4, the olefin-based resin resins are crosslinked with each other during melt-kneading in a kneader, and the crosslink causes poor appearance. Further, a greater part of silane coupling agent other than the silane coupling agents with which the inorganic filler is surface-treated, is volatilized or the silane coupling agents are condensed with each other. For this reason, the desired heat resistance cannot be obtained and, in addition, poor appearance may be caused by condensation of the silane coupling agents.

CITATION LIST

Patent Literatures
Patent Literature 1: JP-A-2000-143935 ("JP-A" means unexamined published Japanese patent application)
Patent Literature 2: JP-A-2000-315424
Patent Literature 3: JP-A-2001-240719
Patent Literature 4: JP-A-2001-101928

SUMMARY OF INVENTION

Technical Problem

The present invention is made to solve the above-described problems, and contemplated for providing a crosslinked resin molded body which is produced by suppressing volatilization of a silane coupling agent, and has excellent appearance, and mechanical characteristics and further also heat resistance, and a method of producing the same.

Further, the present invention is contemplated for providing a silane master batch and a crosslinkable resin composition, which are capable of producing the crosslinked resin molded body, and providing a method of producing the crosslinkable resin composition.

Further, the present invention is contemplated for providing a molded article containing the crosslinked resin molded body.

Solution to Problem

The present inventors found that, upon allowing a graft reaction of a silane coupling agent with a polyolefin-based resin in the presence of an inorganic filler, if the silane coupling agent and the inorganic filler are used under conditions in which an X value specified by Formula (I) satisfies a specific value, volatilization of the silane coupling agent can be prevented, and a crosslinked resin molded body having a combination of excellent appearance and mechanical characteristics, and also high heat resistance can be obtained. The present inventors further continued to conduct research based on these findings, and completed the present invention.

The above-described problems of the present invention can be solved by the following means.

<1> A method of producing a crosslinked resin molded body, comprising the following steps (1), (2) and (3):
step (1): obtaining a mixture by mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin;
step (2): obtaining a molded body by molding the mixture obtained in the step (1); and
step (3): obtaining a crosslinked resin molded body by bringing the molded body obtained in the step (2) into contact with water, wherein the step (1) has the following steps (a) to (d):
step (a): mixing the organic peroxide, the inorganic filler in which an X value specified by Formula (I) satisfies 5 to 1050, and the silane coupling agent;

$$X = \Sigma A/B \quad \text{Formula (I)}$$

wherein, $\Sigma A$ denotes a total amount of a product of a BET specific surface area ($m^2/g$) of the inorganic filler and a blending amount of the inorganic filler, and B denotes a blending amount of the silane coupling agent;
step (b): melting and mixing the mixture obtained in the step (a) with a whole or part of the polyolefin-based resin at a temperature equal to or higher than a decomposition temperature of the organic peroxide;
step (c): mixing the silanol condensation catalyst with, as a carrier resin, a resin different from the polyolefin-based resin or a remaining portion of the polyolefin-based resin; and
step (d): mixing a melted mixture obtained in the step (b) with a mixture obtained in the step (c).

<2> The method of producing a crosslinked resin molded body described in the above item <1>, wherein the mixing amount of the silane coupling agent is more than 4 parts by mass and 15.0 parts by mass or less, with respect to 100 parts by mass of the polyolefin-based resin.

<3> The method of producing a crosslinked resin molded body described in the above item <1> or <2>, wherein the silane coupling agent is vinyltrimethoxysilane or vinyltriethoxysilane.

<4> The method of producing a crosslinked resin molded body described in any one of the above items <1> to <3>, wherein the inorganic filler is at least one selected from the group consisting of silica, aluminum hydroxide, magnesium hydroxide, calcium carbonate, magnesium carbonate, kaolin, zinc borate, zinc hydroxystannate, and talc.

<5> A method of producing a crosslinkable resin composition, comprising the step of:
mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin,
wherein the step has the following steps (a) to (d):
step (a): mixing the organic peroxide, the inorganic filler in which an X value specified by Formula (I) satisfies 5 to 1050, and the silane coupling agent;

$$X = \Sigma A/B \quad \text{(Formula (I)}$$

wherein, $\Sigma A$ denotes a total amount of a product of a BET specific surface area ($m^2/g$) of the inorganic filler and a blending amount of the inorganic filler, and B denotes a blending amount of the silane coupling agent;
a step (b): melting and mixing the mixture obtained in the step (a) with a whole or part of the polyolefin-based resin at a temperature equal to or higher than a decomposition temperature of the organic peroxide;
step (c): mixing the silanol condensation catalyst with, as a carrier resin, a resin different from the polyolefin-based resin or a remaining portion of the polyolefin-based resin; and
step (d): mixing a melted mixture obtained in the step (b) with a mixture obtained in the step (c).

<6> A crosslinkable resin composition produced by the method of producing a crosslinkable resin composition described in the above item <5>.

<7> A crosslinked resin molded body produced by the method of producing a crosslinked resin molded body described in any one of the above items <1> to <4>.

<8> A molded article, comprising the crosslinked resin molded body described in the above item <7>.

<9> A silane master batch used for producing a crosslinkable resin composition prepared by mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin, wherein the silane master batch is prepared through the following steps (a) and (b):

step (a): mixing the organic peroxide, the inorganic filler in which an X value specified by Formula (I) satisfies 5 to 1050, and the silane coupling agent;

$$X=\Sigma A/B \qquad \text{Formula (I)}$$

wherein, $\Sigma A$ denotes a total amount of a product of a BET specific surface area (m$^2$/g) of the inorganic filler and a blending amount of the inorganic filler, and B denotes a blending amount of the silane coupling agent;

step (b): melting and mixing the mixture obtained in the step (a) with a whole or part of the polyolefin-based resin at a temperature equal to or higher than a decomposition temperature of the organic peroxide.

Note that, in this specification, numerical expressions in a style of " . . . to . . . " will be used to indicate a range including the lower and upper limits represented by the numerals given before and after "to", respectively.

Advantageous Effects of Invention

According to the present invention, an inorganic filler and a silane coupling agent are mixed before and/or during kneading with the polyolefin-based resin and thus, volatilization of the silane coupling agent during kneading can be suppressed, and the crosslinked resin molded body can be easily and efficiently produced. Furthermore, the problems of the conventional silane crosslinking method can be overcome by simultaneously using the specific inorganic filler with the silane coupling agent, and a crosslinked resin molded body excellent in appearance, mechanical characteristics and heat resistance can be produced.

Accordingly, according to the present invention, a crosslinked resin molded body excellent in appearance, mechanical characteristics and heat resistance can be produced with the volatilization of the silane coupling agent being suppressed and a method of producing the crosslinked resin molded body is provided. Further, according to the present invention, a silane master batch and a crosslinkable resin composition, capable of forming the crosslinked resin molded body having excellent in such properties, as well as a method of the crosslinkable resin composition can be provided. Further, according to the present invention, a molded article containing the crosslinked resin molded body excellent in the above properties can be provided.

Other and further features and advantages of the invention will appear more fully from the following description.

MODE FOR CARRYING OUT THE INVENTION

The preferable embodiment of the present invention is described in detail below.

In both of the "method of producing a crosslinked resin molded body" of the present invention and the "method of producing a crosslinkable resin composition" of the present invention, the step (1) below is conducted. Further, "silane master batch" of the present invention is prepared through the steps (a) and (b) below.

Accordingly, the "method of producing a crosslinked resin molded body" of the present invention and the "method of producing a crosslinkable resin composition" of the present invention (in the description of parts common to both, the methods may be collectively referred to as a production method of the present invention in some cases) are collectively described below. Moreover, a part common with the production method of the present invention in the method of producing the "silane master batch" of the present invention will be simultaneously described.

Step (1): obtaining a mixture by mixing 0.02 to 0.6 parts by mass of organic peroxide, 0.2 to 300 parts by mass of an inorganic filler, 2 to 15.0 parts by mass of a silane coupling agent, and a silanol condensation catalyst, based on 100 parts by mass of a polyolefin-based resin.

Step (2): obtaining a molded body by molding the mixture obtained in the step (1).

Step (3): obtaining a crosslinked resin molded body by bringing the molded body obtained in the step (2) into contact with water.

The step (1) has the following step (a), step (b), step (c), and step (d).

Step (a): mixing an organic peroxide, an inorganic filler in which an X value specified by Formula (I) satisfies 5 to 1050, and a silane coupling agent;

$$X=\Sigma A/B \qquad \text{Formula (I)}$$

(wherein, $\Sigma A$ denotes a total amount of a product of a BET specific surface area (m$^2$/g) of an inorganic filler and a blending amount of the inorganic filler, and B denotes a blending amount of the silane coupling agent.)

Step (b): melting and mixing the mixture obtained in the step (a) with a whole or part of the polyolefin-based resin at a temperature equal to or higher than a decomposition temperature of the organic peroxide.

Step (c): mixing a silanol condensation catalyst with, as a carrier resin, a resin different from the polyolefin-based resin or a remaining portion of the polyolefin-based resin.

Step (d): mixing a melted mixture obtained in the step (b) with a mixture obtained in the step (c).

The components used in the present invention are described.

<Polyolefin-Based Resin>

The polyolefin-based resin to be used in the present invention is not particularly limited, and examples thereof include a resin used in a molding material, a rubber material, a cable material, and the like with which the above-described rubber products are formed. Specific examples thereof include each resin composed of polyethylene, polypropylene, polybutene, an ethylene-α-olefin copolymer, and a copolymer having an acid copolymerization component or an acid ester copolymerization component; and rubber or elastomer composed of these polymers.

Among them, each resin such as polyethylene, polypropylene, an ethylene-α-olefin copolymer, an ethylene-(meth)acrylic acid ester copolymer, and an ethylene-vinyl acetate copolymer; or each rubber such as ethylene-propylene rubber, ethylene-propylene-diene rubber, and ethylene-butene rubber is preferable.

The polyolefin-based resin may be used in one kind thereof or in combination of the two or more kinds thereof.

In a case where the polyolefin-based resin contains a plurality of components, a content of each component is appropriately adjusted in such a manner that a total of each component comes to 100 mass %, and preferably selected from the following range.

The polyethylene is not particularly limited, and examples thereof include a homopolymer of ethylene high-density polyethylene (HDPE), low-density polyethylene (LDPE), ultra-high molecular weight polyethylene (UHMW-PE), linear low-density polyethylene (LLDPE), and very-low-density polyethylene (VLDPE). Among them, linear low-density polyethylene or low-density polyethylene is preferable.

A blending amount of polyethylene is preferably 0 to 95 mass %, and further preferably 0 to 60 mass % in the polyolefin-based resin.

The polypropylene includes a propylene homopolymer, and also, as a copolymer, an ethylene-propylene copolymer such as random polypropylene, and block polypropylene.

A blending amount of polypropylene is preferably 0 to 50 mass %, and further preferably 0 to 30 mass % in the polyolefin-based resin.

The ethylene-α-olefin copolymer is not particularly limited as long as a copolymer other than polyethylene and polypropylene is applied, and specific examples thereof include preferably a copolymer of ethylene and α-olefin having 3 to 12 carbon atoms, and further preferably a copolymer of ethylene and α-olefin having 4 to 12 carbon atoms. Specific examples of α-olefin is not particularly limited and include propylene, 1-butene, 1-hexene, 4-methyl-1-pentene, 1-octene, 1-decene, 1-dodecene, and the like. The ethylene-α-olefin copolymer is not particularly limited and specific examples thereof include an ethylene-propylene copolymer, an ethylene-butylene copolymer, and an ethylene-α-olefin copolymer that is synthesized in the presence of a single-site catalyst.

In the polyolefin-based resin, a blending amount of the ethylene-α-olefin copolymer is preferably from 0 to 95 mass %, and further preferably from 0 to 80 mass %.

The copolymer having the acid copolymerization component or the acid ester copolymerization component is not particularly limited and the specific examples thereof include ethylene-vinyl acetate copolymer, ethylene-(meth)acrylic acid copolymers, ethylene-alkyl (meth)acrylate copolymers or the like. Among them, ethylene-vinyl acetate copolymers, ethylene-methyl acrylate copolymers, ethylene-ethyl acrylate copolymers, and ethylene-butyl acrylate copolymers are preferable; and ethylene-vinyl acetate copolymers are more preferable from the standpoint of the acceptability to the inorganic filler and heat resistance.

A blending amount of the copolymer having the acid copolymerization component or the acid ester copolymerization component is preferably 0 to 80 mass %, and further preferably 0 to 50 mass % in the polyolefin-based resin.

Moreover, as the polyolefin-based resin, a resin formed by modifying the above-described polymer or the like with unsaturated carboxylic acid, for example, an acid anhydride modified material and a modified material thereof (acid-modified resin) such as maleic anhydride-modified polyethylene can be used.

In a case where these are used as a polyolefin-based resin, the blending amount thereof in the polyolefin-based resin is preferably 0.5 to 30 parts by mass.

The elastomer to be used in the present invention is not particularly limited, and specific examples thereof include a styrene-based elastomer such as a styrene-butylene-styrene block copolymer (SBS), a styrene-isoprene-styrene block copolymer (SIS), a styrene-ethylene-propylene-styrene block copolymer (SEPS), a styrene-ethylene-ethylene-propylene-styrene block copolymer (SEEPS), and styrene-ethylene-butylene-styrene block copolymer (SEBS).

A blending amount of elastomer is preferably 0 to 95 mass %, and further preferably 0 to 80 mass % in the polyolefin-based resin.

The rubber to be used in the present invention is not particularly limited, but ethylene rubber is preferable. The ethylene rubber is not particularly limited, as long as the ethylene rubber is rubber (including elastomer) composed of the copolymer obtained by copolymerizing a compound having an ethylenically unsaturated bond. Specific examples of the ethylene rubber preferably include a rubber composed of a copolymer of ethylene and α-olefin, and a rubber composed of a terpolymer of ethylene, α-olefin and diene. As α-olefin, α-olefin having 3 to 12 carbon atoms is preferable. Specific examples of the rubber composed of the copolymer of ethylene and α-olefin include ethylene-propylene rubber (EPR), ethylene-butene rubber (EBR), and ethylene-octene rubber. Specific examples of the rubber composed of the terpolymer of ethylene, α-olefin, and diene include ethylene-propylene-diene rubber and ethylene-butene-diene rubber.

A blending amount of ethylene rubber is preferably 0 to 90 mass %, and further preferably 0 to 80 mass % in the polyolefin-based resin.

In the present invention, the polyolefin-based resin may contain paraffin oil or naphthene oil. In particular, the rubber (ethylene rubber) or the styrene-based elastomer as described above and paraffin oil or naphthene oil are preferably used in combination thereof. As the oil, the paraffin oil is preferable in view of mechanical strength.

A blending amount of oil is preferably 0 to 60 mass %, and further preferably 0 to 40 mass % in the polyolefin-based resin.

In the present invention, the oil is to be contained in the polyolefin-based resin.

The resin may contain, in addition to the above-described components, an additive to be described later or a resin component other than the above-described resin components.

<Organic Peroxide>

The organic peroxide plays a role of generating a radical at least by thermal decomposition, to cause a grafting reaction of the silane coupling agent onto the polyolefin resin component, as a catalyst.

The organic peroxide to be used in the present invention is not particularly limited, as long as the organic peroxide is one that generates a radical. For example, as the organic peroxide, the compound represented by the formula $R^1$—OO—$R^2$, $R^1$—OO—C(=O)$R^3$, or $R^4$C(=O)—OO(C=O)$R^5$ is preferable. Herein, $R^1$, $R^2$, $R^3$, $R^4$, and $R^5$ each independently represent an alkyl group, an aryl group, or an acyl group. Among them, in the present invention, it is preferable that all of $R^1$, $R^2$, $R^3$, $R^4$, and $R^5$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexine-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butylcumyl peroxide and the like. Among them, 2,5-dimethyl-2,5-di-(tert-butyl peroxy)hexane, or 2,5-dimethyl-2,5-di-(tert-butyl peroxy)hexine-3 is preferable, from the standpoint of odor, coloration, and scorch stability.

The decomposition temperature of the organic peroxide is preferably 120 to 190° C., and more preferably 125 to 180° C.

In the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or exothermic reaction starts, when the organic peroxide is heated at room temperature in a rising rate of 5° C./min under a nitrogen gas atmosphere, by a thermal analysis such as a DSC method.

<Inorganic Filler>

The inorganic filler used in the present invention is not particularly limited and as such an inorganic filler, use can be made of metal hydroxide or metal hydrate, such as a metal compound having a hydroxy group or crystallized water, for example, aluminum hydroxide, magnesium hydroxide, calcium carbonate, magnesium carbonate, silica, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, and hydrotalcite. In addition, boron nitride, carbon, clay, zinc oxide, tin oxide, titanium oxide, molybdenum oxide, antimony trioxide, a silicone compound, quartz, talc, kaolin, zinc borate, white carbon, zinc borate, zinc hydroxystannate, or zinc stannate is exemplified.

The inorganic filler may be subjected to surface treatment, or no treatment.

Specific examples of a surface treatment agent include fatty acid such as stearic acid and oleic acid, a silane coupling agent, phosphate, a titanate coupling agent, and colloidal silica.

Among those inorganic fillers, at least one selected from the group consisting of silica, aluminum hydroxide, magnesium hydroxide, calcium carbonate, magnesium carbonate, aluminum oxide (boehmite), kaolin, zinc borate, zinc hydroxystannate, and talc is preferable. The inorganic filler is appropriately selected from the materials described above, and specific examples include a form containing metal hydroxide such as aluminum hydroxide and magnesium hydroxide, and a form containing no metal hydroxide.

The BET specific surface area Yi ($m^2/g$) of the inorganic filler is not particularly limited as long as an X value specified by Formula (I) to be described later satisfies the above-described range. In view of exhibiting an expected effect without reducing an amount of the silane coupling agent to be bonded onto a surface of the inorganic filler, and further in view of a capability of reducing the blending amount of the inorganic filler, the BET specific surface area of the inorganic filler is preferably 0.5 to 400 $m^2/g$, further preferably 0.8 to 350 $m^2/g$, and still further preferably 1 to 300 $m^2/g$.

The BET specific surface area Yi ($m^2/g$) of the inorganic filler is expressed in terms of a value measured by using a nitrogen gas as an adsorbate in accordance with a "carrier-gas method" of JIS Z 8830:2013. For example, the value measured by using a specific surface area and pore distribution measuring device "FlowSorb" (manufactured by Shimadzu Corporation) is applied.

In a case where the inorganic filler is powder, an average particle diameter thereof is preferably 0.1 to 20 μm, further preferably 0.5 to 5 μm, and still further preferably 0.6 to 2.5 μm. If the average particle diameter of the inorganic filler is within the above-described range, the crosslinked resin molded body can be provided with the heat resistance. The average particle diameter refers to an average value determined from particle diameters of 100 particles of the inorganic filler as measured by TEM, SEM or the like.

The inorganic filler may be used singly, or in combination of two or more kinds thereof.

<Silane Coupling Agent>

The silane coupling agent (also referred to as a "hydrolyzable silanol compound") used in the present invention is not particularly limited, and a silane coupling agent conventionally used for a silane crosslinking method may be used. As such a silane coupling agent, for example, a compound represented by the following Formula (1) is preferable.

Formula (1)

In formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

In formula (1), $R_{a11}$ may include a vinyl group, a (meth) acryloyl oxyalkylene group, a p-styryl group, or the like, and a vinyl group is preferable.

$R_{b11}$ represents an aliphatic hydrocarbon group, a hydrogen atom, or $Y^{13}$ to be described below, and $Y^{13}$ is preferable. Example of the aliphatic hydrocarbon group may include a monovalent aliphatic hydrocarbon group having 1 to 8 carbon atoms other than an aliphatic unsaturated hydrocarbon group.

$Y^{11}$, $Y^{12}$, and $Y^{13}$ each independently represent a hydrolyzable organic group, and examples thereof may include an alkoxy group, an aryloxy group, and an acyloxy group, and an alkoxy group is preferable. Specific examples of the hydrolyzable organic group may include methoxy, ethoxy, butoxy, and acyloxy. Among them, from the standpoint of the reactivity, methoxy or ethoxy is preferable.

As the silane coupling agent, a silane coupling agent that has high hydrolysis rate is preferable, and a silane coupling agent, in which $R_{b11}$ is $Y^{13}$ and also $Y^{11}$, $Y^{12}$, and $Y^{13}$ are the same each other, is more preferable. Specific examples thereof include organosilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and silane coupling agents having an ethylenically unsaturated bond such as methacryloxypropyltrimethoxysilane, methacryloxypropyltriethoxysilane, and methacryloxypropylmethyldimethoxysilane. The silane coupling agent may be used singly or two or more kinds thereof. Among these crosslinking silane coupling agents, a silane coupling agent having a vinyl group and an alkoxy group on an end thereof is more preferable, and vinyltrimethoxysilane and vinyltriethoxysilane are still more preferable.

The silane coupling agent may be used as it is, or may be diluted with a solvent and used.

<Silanol Condensation Catalyst>

The silanol condensation catalyst has an action of binding the silane coupling agents which have been grafted onto the polyolefin-based resin to each other, by a condensation reaction in the presence of water. Based on the action of the silanol condensation catalyst, the resin components are crosslinked between themselves through silane coupling agent. As a result, the crosslinked resin molded body having excellent heat resistance can be obtained.

The silanol condensation catalyst is not particularly limited and examples thereof include an organic tin compound, a metal soap, a platinum compound, and the like. Usual examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like.

<Carrier Resin>

The carrier resin to be used in the present invention is not particularly limited, and a resin similar to the above-described polyolefin-based resin can be used. Polyethylene and polypropylene are preferable. The carrier resin may contain a resin component such as ethylene rubber and styrene based elastomer, and/or oil.

As the carrier resin, in a case where part of the polyolefin-based resin is used in the step (b), a remaining portion of the polyolefin-based resin can be used.

In the present invention, a term "part of the polyolefin-based resin" means part of the resin to be used in the step (1) of the polyolefin-based resin. This part includes part of the polyolefin-based resin itself (having the composition same with the composition of the polyolefin-based resin), part of resin component which constitutes the polyolefin-based resin (for example, less than a total amount of a specific resin component), and a resin component of part which constitutes the polyolefin-based resin (for example, a total amount of a specific resin component of a plurality of resin components).

In addition, "remainder of the polyolefin-based resin" means a remaining polyolefin-based resin excluding the part to be used in the step (b) in the polyolefin-based resin. This remainder includes a remainder of the polyolefin-based resin itself (i.e. it has a composition same as that of the polyolefin-based resin), a remainder of the resin components that constitute the polyolefin-based resin, and a remaining resin component that constitutes the polyolefin-based resin.

<Additive>

To the crosslinked resin molded body and the crosslinkable resin composition, various additives which are usually used for electric wires, electric cables, electric cords, member of automobile, member of architecture, sundry goods, sheets, foams, tubes, and pipes, may be properly used in the range that does not adversely affect the effects exhibited by the present invention.

Examples of these additives include a crosslinking assistant, an antioxidant, a lubricant, a metal inactivator, a flame retardant (a flame retardant aid), and other resins.

The crosslinking assistant refers to compound that forms a partial crosslinking structure with the resin component, in the presence of the organic peroxide. Examples thereof may include polyfunctional compounds.

Examples of the antioxidant may include an amine-based antioxidant such as 4,4'-dioctyl-diphenylamine, N,N'-diphenyl-p-phenylenediamine, 2,2,4-trimethyl-1,2-dihydroquinoline polymer; a phenol-based antioxidant such as pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and a sulfur-based antioxidant such as bis(2-methyl-4-(3-n-alkylthiopropionyloxy)-5-tert-butylphenyl)sulfide, 2-mercaptobenzi mid azole and zinc salts thereof, and pentaerythritoketrakis(3-laurylthiopropionate). An antioxidant is preferably included in a content of 0.1 to 15.0 parts by mass, and more preferably included in a content of 0.1 to 10 parts by mass, with respect to 100 parts by mass of the resin.

Examples of the metal inactivator may include 1,2-bis(3-(3,5-di-tert-butyl-4-hydroxyphenyl)propionyl)hydrazine, 3-(N-salicyloyl)amino-1,2,4-triazole, and 2,2'-oxamidebis(ethyl-3-(3,5-di-tert-butyl-4-hydroxyphenyl)propionate).

Examples of the lubricant may include hydrocarbon-based, siloxane-based, fatty-acid-based, fatty-acid-amide-based, ester-based, alcohol-based, or metal-soap-based lubricants.

Next, the production method of the present invention is specifically described.

In the production method of the present invention, in the step (1), the organic peroxide of from 0.02 to 0.6 parts by mass, the inorganic filler of from 0.2 to 300 parts by mass, the silane coupling agent of from 2 to 15.0 parts by mass and the silanol condensation catalyst, with respect to 100 parts by mass of the polyolefin-based resin, are mixed to prepare a mixture. In this manner, the crosslinkable resin composition is prepared.

In the step (1), the blending amount of the polyolefin-based resin is not particularly limited, but is preferably an amount to be preferably 50 mass % or more, and further preferably 70 mass % or more in a content thereof in the crosslinkable resin composition obtained in the step (1).

In the step (1), the blending amount of the organic peroxide is 0.02 to 0.6 parts by mass, and more preferably 0.04 to 0.4 parts by mass, with respect to 100 parts by mass of the polyolefin-based resin. Neither a crosslinking reaction between the resin components, being a side reaction, progresses nor aggregated substances are generated by adjusting the organic peroxide within this range, and a silane graftmer having excellent extrudability can be prepared.

In the present invention, a blending amount of the inorganic filler is 0.2 to 300 parts by mass, with respect to 100 parts by mass of polyolefin-based resin. If the blending amount of the inorganic filler is less than 0.2 part by mass, the silane coupling agent is easily volatilized, and heat resistance of the crosslinkable resin composition or the crosslinked resin molded body to be obtained is reduced in several cases. Moreover, the aggregated substances are generated, the molding material is foamed, or stickiness of the molding material is eventually increased, and in any case, a problem in production occurs in several cases. On the other hand, if the blending mount is over 300 parts by mass, the heat resistance or the mechanical characteristics of the crosslinkable resin composition or the crosslinked resin molded body is reduced, or poor appearance is caused or a gel, the aggregated substances and the like are generated in several cases. Furthermore, the crosslinked resin molded body having excellent characteristics described above becomes unable to be produced.

The blending amount of the inorganic filler can be reduced as long as the X value specified by Formula (I) satisfies 5 to 1050. For example, in view of a capability of producing a lightweight crosslinked resin molded body, while the X value specified by Formula (I) is satisfied and the above-described characteristics are kept, the blending amount of the inorganic filler is preferably 0.3 to 250 parts by mass, further preferably 0.4 to 120 parts by mass, and particularly preferably 0.5 to 9.5 parts by mass.

A blending amount of the silane coupling agent is 2 to 15.0 parts by mass, with respect to 100 parts by mass of the polyolefin-based resin. In a case where the blending amount of the silane coupling agent is less than 2 parts by mass, the crosslinking reaction does not sufficiently progress, and the crosslinkable resin composition or the crosslinked resin molded body may be unable to be provided with desired heat resistance or mechanical characteristics in several cases. On the other hand, in a case where the blending amount is over 15.0 parts by mass, the melt and kneading may become hard in several cases, and molding into a desired shape may be unable to be achieved upon extrusion molding in several cases. A blending amount of the silane coupling agent is preferably more than 4 parts by mass and 15 parts by mass or less, more preferably more than 4 parts by mass and 12 parts by mass or less.

In the present invention, the BET specific surface area and the blending amount of the inorganic filler and the blending amount of the silane coupling agent are selected in the above-described range in such a manner that the X value specified by Formula (I) falls within the range of 5 to 1050. More specifically, the inorganic filler and the silane coupling agent are used in a combination in which the X value described below falls within the range of 5 to 1050.

$$X=\Sigma A/B \qquad \text{Formula (I)}$$

wherein, $\Sigma A$ denotes a total amount of a product of a BET specific surface area Yi (m²/g) of an inorganic filler and a blending amount Zi of the inorganic filler. Accordingly, in a case where a plurality of inorganic fillers are used, the total amount of the product of the BET specific surface area Yi and the blending amount Zi for each inorganic filler is taken as $\Sigma A$. B denotes a blending amount of the silane coupling agent.

The blending amount Zi of the inorganic filler and the blending amount B of the silane coupling agent each are expressed in terms of a proportion (part by mass) based on 100 parts by mass of the polyolefin-based resin in the step (1).

In the present invention, the X value specified by Formula (I) specifies a relationship between the whole inorganic filler and the silane coupling agent used in the step (a). In the step (a), the silane coupling agent is bonded with or adsorbed onto each inorganic filler, to a certain degree, and therefore bonding or adsorption of the silane coupling agent relates to the surface area of the whole inorganic filler. Accordingly, in the present invention, characteristics of the whole inorganic filler with which the silane coupling agent is bonded, the bonding being formed in the silane master batch, are specified by the X value specified by Formula (I).

In the production method of the present invention, if the X value specified by Formula (I) falls within the range of 5 to 1050, the lightweight crosslinked resin molded body having a combination of the excellent appearance, mechanical characteristics and heat resistance can be produced.

A mechanism thereof is unknown yet, but it is assumed as described below.

In the step (1), the polyolefin-based resin is heat-kneaded with the inorganic filler and the silane coupling agent, in the presence of the organic peroxide, at a temperature equal to or higher than the decomposition temperature of the organic peroxide. Thereby, the organic peroxide is decomposed to generate radical, and grafting onto the polyolefin-based resin is caused by the silane coupling agent. In addition, a reaction of forming a chemical bond due to covalent bonding of the silane coupling agent with the group such as the hydroxyl group on the surface of the inorganic filler also partially occurs by heating on the above occasion.

More specifically, in the production method of the present invention, the inorganic filler and the silane coupling agent are used before kneading and/or during kneading with the polyolefin-based resin. Thus, the silane coupling agent is bonded with the inorganic filler by means of a hydrolyzable organic group such as an alkoxy group and is bonded with an uncrosslinked part of the polyolefin-based resin by means of an ethylenically unsaturated group, such as a vinyl group, existing at the other end, and kept thereon. Alternatively, the silane coupling agent is physically and chemically adsorbed onto pores or the surface of the inorganic filler, and kept thereon, without being bonded with the inorganic filler by means of the alkoxy group or the like. Thus, the present invention can form a silane coupling agent bonded with the inorganic filler by strong bonding (as the reason therefor, for example, formation of chemical bond with hydroxyl group or the like on the surface of the inorganic filler is considered), and a silane coupling agent bonded therewith by weak bonding (as the reason therefor, for example, interaction due to hydrogen bond, interaction between ions, partial electric charges, or dipoles, action due to adsorption, or the like is considered).

In this state, if the organic peroxide is added thereto and kneading is performed, at least two kinds of silane crosslinkable resins are formed in which the silane coupling agents having different bondings with the inorganic filler are graft reacted onto the polyolefin-based resin.

By the above kneading, among the silane coupling agents, the silane coupling agent having strong bonding with the inorganic filler keeps the bonding with the inorganic filler, and the crosslinkable group such as ethylenically unsaturated group is subjected to the grafting reaction onto a crosslinkable site in the polyolefin-based resin. In particular, when a plurality of the silane coupling agents are bonded on the surface of one inorganic filler particle through strong bonding, a plurality of the polyolefin-based resins are bonded through the inorganic filler particle. By these reactions or bondings, a crosslinked network through the inorganic filler spreads.

The X value specified by Formula (I) represents the surface area of the inorganic filler relative to the blending amount of the silane coupling agent which can be bonded with the surface. If the X value, namely, the surface area Yi of the inorganic filler which can be bonded with the silane coupling agent increases, the surface area of inorganic filler particles in a predetermined amount is large, and therefore a larger amount of the silane coupling agent can be bonded per unit surface area of the inorganic filler particles. Accordingly, even if the blending amount of the inorganic filler is reduced, the amount of the silane coupling agent which is bonded with the inorganic filler can be maintained. Thus, a crosslinking network by the inorganic filler is maintained, and the above-described excellent characteristics can be exhibited in the crosslinked resin molded body.

However, if the X value excessively decreases to a level less than 5, the surface area of the inorganic filler relative to the silane coupling agent decreases, and the silane coupling agent becomes hard to bond with the inorganic filler (a bonding amount is reduced). Accordingly, the silane coupling agent is eventually volatilized during melting and kneading, or the side reaction is eventually caused. Thus, the crosslinked resin molded body obtained results in poor heat resistance, and poor appearance depending on conditions.

Moreover, the crosslinked resin molded body may become hard to produce in several cases.

On the other hand, if the X value excessively increases to a level over 1050, the surface area of the inorganic filler relative to the silane coupling agent increases, and the silane coupling agent is eventually bonded with the inorganic filler by strong bonding. Accordingly, the silane coupling agent which is bonded with the inorganic filler by weak bonding can be hardly formed. Thus, a silane grafting reaction becomes hard to take place, the heat resistance is unable to be maintained, or polymer chains are eventually bonded with each other by the crosslinking agent. As a result, the crosslinked resin molded body obtained results in the poor heat resistance, and depending on conditions, in poor appearance or mechanical characteristics.

The X value specified by Formula (I) is preferably 5 to 650, further preferably 8 to 450, still further preferably 10 to 250, and particularly preferably 10 to 200, in view of resulting in producing the product having particularly excellent heat resistance.

The X value specified by Formula (I) can be appropriately adjusted by the BET specific surface area or the blending amount of the inorganic filler, or the blending amount of the silane coupling agent.

In the step (1), the amount of incorporating the silanol condensation catalyst is not particularly limited and is preferably from 0.01 to 1 parts by mass, further preferably from 0.03 to 0.6 parts by mass, particularly preferably from 0.05 to 0.5 parts by mass, with respect to 100 parts by mass of the polyolefin-based resin. If the blending amount of the silanol condensation catalyst is within the above-described range, the crosslinking reaction sufficiently progresses, resulting in producing the product having excellent heat resistance (particularly, heat resistance at a high temperature) and deformability. Moreover, the reaction between the silane coupling agents can be suppressed, and gelation, the aggregated substances, and foaming by volatilization of the silane coupling agent can be suppressed.

In the step (1), a blending amount of other resins or the above-described additives each which can be used in addition to the above-described components can be appropriately set within the range in which the purpose of the present invention is not adversely affected.

It is preferable that the crosslinking assistant be not substantially mixed in the step (1). Herein, the term "is not substantially contained or is not substantially mixed" means that the crosslinking assistant is not actively added or mixed and it is not intended to exclude the crosslinking assistant which is inevitably contained or mixed.

The step (1) has the following steps (a) to (d). If the step (1) has these steps, each component can be uniformly melted and mixed, and the expected effect can be obtained.

Step (a): mixing the organic peroxide, the inorganic filler in which an X value specified by Formula (I) satisfies 5 to 1050, and the silane coupling agent;

$$X = \Sigma A / B \quad \text{Formula (I)}$$

(wherein, $\Sigma A$ denotes a total amount of a product of a BET specific surface area (m$^2$/g) of the inorganic filler and a blending amount of the inorganic filler, and B denotes a blending amount of the silane coupling agent.)

Step (b): melting and mixing the mixture obtained in the step (a) with a whole or part of the polyolefin-based resin at a temperature equal to or higher than a decomposition temperature of the organic peroxide.

Step (c): mixing the silanol condensation catalyst with, as a carrier resin, a resin different from the polyolefin-based resin or a remaining portion of the polyolefin-based resin.

Step (d): melting and mixing a melted mixture obtained in the step (b) with a mixture obtained in the step (c) at a temperature equal to or higher than a melting temperature of the polyolefin-based resin.

In the step (a), the organic peroxide, the inorganic filler, the silane coupling agent, and other resins or the like as desired are mixed in the above-described content. The mixing only needs be treatment according to which these components can be mixed, and specific examples include blending at a temperature lower than the decomposition temperature of the organic peroxide, for example, room temperature (25° C.).

In the step (a), as long as the above temperature is kept, the polyolefin-based resin may be existed.

Subsequently, the above-described mixture and the whole or part of the polyolefin-based resin are melted and kneaded (also referred to as melted and mixed) while the mixture is heated by using a mixer such as the Banbury mixer (step (b)). Thus, the silane master batch can be obtained as a melted mixture.

The kneading temperature is a temperature equal to or higher than a decomposition temperature of the organic peroxide, and preferably 150 to 230° C. At this kneading temperature, the above-described component is melted, the organic peroxide decomposes and acts, and the silane grafting reaction required therefor progresses. Kneading conditions such as a kneading time can be appropriately set.

As a kneading method, a method ordinarily applied for rubber, plastic or the like may be applied. As a kneading device, for example, a single-screw extruder, a twin-screw extruder, a roll, a Banbury mixer, or various kneaders may be used.

In the present invention, in the step (step (a)) of preparing the above-described mixture, the melted mixture can be prepared by mixing, without being applied as a step different from the above-described melting and kneading step (step (b)), the organic peroxide, the above-described inorganic filler, the silane coupling agent, the polyolefin-based resin and the like all together. For example, the step (a) can be performed as one step combined with the step (b) in which melting and mixing are performed by a kneader or the like. Specifically, each component to be used in the step (a) can be blended at an initial stage of the kneading step.

In both of the step (a) and the step (b), the above-mentioned each component is preferably mixed without mixing the silanol condensation catalyst. Thus, the condensation reaction of the silane coupling agent can be suppressed.

The silane master batch prepared in the step (b) contains at least two kinds of the silane crosslinkable resins (silane grafted polymers) in which the silane coupling agents are grafted onto the polyolefin-based resin.

In the present invention, differently from the step (a) and the step (b), the silanol condensation catalyst and the carrier resin are mixed (step (c)). Thus, a crosslinking promotion master batch is obtained. This mixing only needs be treatment capable of uniformly mixing the materials, and specific examples include mixing (melting and mixing) performed under melting of the carrier resin.

As the carrier resin, in a case where part of the polyolefin-based resin is used in the step (b), the remaining portion of the polyolefin-based resin can be used. In this case, the blending amount of the polyolefin-based resin in the step (b) is preferably 99 to 40 parts by mass, more preferably 98.5 to 60 parts by mass, while the blending amount of the polyolefin-based resin in the step (c) is preferably 1 to 60 parts by mass, more preferably 1.5 to 40 parts by mass. In the present invention, 100 parts by mass in total of the polyolefin-based resin used in both steps of the step (b) and the step (c) serve as a reference of the blending amount of each component.

On the other hand, in a case where the whole of the polyolefin-based resin is used in the step (b), a resin different therefrom can be used in the step (c). The different resin is not particularly limited, and specific examples include various resins. In this case, the blending amount of the other resin is preferably 1 to 50 parts by mass, more preferably 3 to 30 parts by mass, with respect to 100 parts by mass of the polyolefin-based resin.

The blending amount of the silanol condensation catalyst is as described above, and is appropriately determined according to the blending amount of the carrier resin.

In the production method of the present invention, subsequently, the melted mixture obtained in the step (b) (silane master batch) and the mixture obtained in the step (c) (crosslinking promotion master batch) are melted and kneaded while heating them (step (d)). Thus, the crosslinkable resin composition can be obtained as a melted mixture.

A mixing temperature thereof may be a temperature equal to or higher than a melting temperature of the polyolefin-based resin or the carrier resin, and is preferably 150 to 230° C.

The melting and mixing can be performed in a manner similar to the melting and mixing in the step (b), for example.

In the step (1), the steps (a) to (d) can be simultaneously or successively performed.

The crosslinkable resin composition to be obtained contains at least two kinds of silane crosslinkable resins. This crosslinkable resin composition is an uncrosslinked body in which the silane coupling agent is not subjected to silanol condensation. Practically, under the melting and mixing in the step (d), partially crosslinking (partial crosslinking) is unavoidable, but at least moldability in molding in the step (2) is kept for the crosslinkable resin composition to be obtained.

In the method of producing a crosslinked resin molded body of the present invention, subsequently, the steps (2) and (3) are carried out. In other words, in the method of producing a crosslinked resin molded body of the present invention, the step (2) of obtaining a molded body by molding the mixture thus obtained is performed. The step (2) only has to mold the mixture, and the molding method and molding conditions can be appropriately selected depending on the form of the molded article of the present invention. Specific examples of the molding method include extrusion molding using an extruder, extrusion molding using an injection molding machine, and molding using other molding machines.

The step (2) can be carried out simultaneously or continuously with the step (d). More specifically, specific examples of one embodiment of the melting and mixing in the step (d) include an aspect in which the molding raw materials are melted and mixed upon the melting and molding, for example, upon the extrusion molding or immediately therebefore. For example, in a case where an insulated wire or the like is produced, a series of steps can be employed in which the molding materials of the silane master batch and the crosslinking promotion master batch are melt-kneaded in a coating device, and subsequently, for example, extruded and coated on the outer periphery of a conductor or the like, and molded into a desired shape.

In the molded body obtained in the step (2), the partial crosslinking is unavoidable in a manner similar to the crosslinkable resin composition, but the molded body is in a partially crosslinked state of holding the moldability according to which molding can be made in the step (2).

In the method of producing a crosslinked resin molded body of the present invention, a step (3) is carried out in which the molded body obtained in the step (2) is contacted with water. Thus, the crosslinked resin molded body in which the silane coupling agent is subjected to silanol condensation to cause crosslinking can be obtained.

In the step (3), the crosslinking can be promoted by applying moist heat treatment or warm water treatment to the molded body, or immersing the molded body into water at room temperature, or allowing the molded body to stand at room temperature, thereby hydrolyzing, by moisture, the silane coupling agent subjected to graft treatment to the polyolefin-based resin. Contact conditions such as a contact time can be appropriately set.

Thus, the crosslinked resin molded body of the present invention is produced. This crosslinked resin molded body contains the resin component in which each of two kinds of silane crosslinkable resins is condensed through a siloxane bond, as described later.

Details of a reaction mechanism and the like in the production method of the present invention are unknown yet, but it is considered as described below.

That is, it is possible to suppress the volatilization of the silane coupling agent when kneading by further mixing the silane coupling agent with the inorganic filler before and/or when blending with the polyolefin-based resin. Therefore, reduction of the heat resistance and the appearance of the heat-resistant silane crosslinked resin molded body can be prevented. In addition, it is possible to form the silane coupling agent which is linked to the inorganic filler by a strong bond and the silane coupling agent which is linked to the inorganic filler by a weak bond.

In a case where the inorganic filler subjected to such surface treatment is kneaded with the polyolefin-based resin at a temperature equal to or higher than the melting point thereof in the presence of the organic peroxide, the surface-treated inorganic filler can create a bond with the polyolefin-based resin and between the surface-treated inorganic fillers, through the silane coupling agent strongly bonded with the inorganic filler (reaction k).

On the other hand, the silane coupling agent which is weakly bonded to the inorganic filler removes from the inorganic filler and bonds with the polyolefin-based resin by the grafting reaction (reaction m). The silane coupling agent which is grafted to the polyolefin-based resin by such a (reaction m) is then mixed with the silanol condensation reaction catalyst and undergoes the condensation reaction by coming in contact with water so as to form a crosslink via siloxane bond (reaction n).

As described above, the silane coupling agent bonded with the inorganic filler by strong bonding contributes to mainly high mechanical characteristics, and further to abrasion resistance, scratch resistance, and reinforcement property. Further, the silane coupling agent bonded with the inorganic filler by weak bonding contributes to improvement of a degree of crosslinking mainly.

Accordingly, a degree of crosslinking and mechanical strength, and further wear resistance, scratch resistance and reinforcement property can be controlled by controlling these bonds.

In the present invention, the BET specific surface area and the blending amount of the inorganic filler, and the blending amount of the silane coupling agent are adjusted to the specific range in which the X value specified by Formula (I) satisfies 5 to 1050. Thus, the reaction k, the reaction m and the reaction n are combined with each other, thereby being able to provide the crosslinked resin molded body and the crosslinkable resin composition with high heat resistance, and also the excellent mechanical characteristics and appearance, and further wear resistance and scratch resistance.

Moreover, the inorganic filler includes fillers having various effects and action, such as a filler having a large or small surface area per unit mass, a filler providing the product with flame retardancy, a filler providing the product with weather resistance, a filler improving insulating characteristics, and a filler providing the product with thermal conductivity.

These fillers are mixed with a hydrolyzable silane coupling agent in such a manner that the X value specified by Formula (I) falls within the above-described range, and the resultant mixture is subjected to the surface treatment. Thus, both the heat resistance, the mechanical characteristics, the wear resistance or the scratch resistance and other various characteristics, for example, both the heat resistance and the flame retardancy, and both the heat resistance and the insulating characteristics can be satisfied. For example, in a case where the inorganic filler having a large BET specific surface such as silica is used, while the X value specified by Formula (I) is satisfied, the blending amount thereof can be reduced. Thus, the crosslinked resin molded body produced by using the filler having the large BET surface area has a small specific gravity, resulting in lightweight.

The production method of the present invention is applicable to production of a product (including a semi-finished product and a part) requiring the heat resistance, a product requiring the strength, a product requiring the flame retardancy, and a product such as a rubber material. Accordingly, the molded article of the present invention is processed into such a product. At this time, the molded article may be a molded article including the crosslinked resin molded body, or may be a molded article consisting of the crosslinked resin molded body.

Specific examples of the molded body of the present invention include a coating material of a wire such as a heat-resistant flame-retardant insulated wire or a heat-resistant flame-retardant cable, a rubber substitute wire and cable material, other heat-resistant flame-retardant wire parts, a flame-retardant heat-resistant sheet, a flame-retardant heat-resistant film or the like, a part for automobile equipment, a cushion material for automobile, a power supply plug, a connector, a packing, a cushion material, a seismic isolating material, a box, a tape base material, a tube, a sheet, a wiring material used in internal and external wiring for electric and electronic instruments, an insulator or an electric wire, a sheath, and the like.

In a case where the molded article of the present invention is an extrusion molded article such as an electric wire, a cable, a tube, and a cushioning material, while the molding material is melted and kneaded in an extrusion coating device, the molding material can be coated on a conductor and molded, and extrusion molded into a tube shape, or a rod shape or a sheet shape (the step (d) and the step (2)).

Moreover, in a case where the molding material is injection molded into a box, various parts or the like, the molded article can be obtained by introducing the molding material into the injection molding machine, and performing injection molding.

These molded articles can be provided with the high heat resistance by causing crosslinking by bringing the molded article into contact with moisture by allowing the molded article to stand at normal temperature or the like, at moist heat, or applying warm water treatment or the like.

A thickness of these molded articles each is, although a level is not unequivocally determined according to an application or the like, ordinarily about 0.1 to 50 mm.

EXAMPLES

The present invention is described in more detail based on examples given below, but the present invention is not limited by the following examples.

In addition, in Table 1 to Table 5, the numerical values for incorporated amounts of the respective Examples and Comparative Examples are in terms of part by mass.

With regard to Examples 1 to 33 and Comparative Examples 1 to 6 each, operation was carried out by using the following components, and setting respective specifications to conditions shown in Table 1 to Table 5 each, and evaluations to be described later were carried out.

The details of each compounds in tables 1 to 5 are described below.
<Polyolefin-Based Resin>
(Polyethylene: PE)
"EVOLUE SP0540F" (trade name, manufactured by Prime Polymer Co., Ltd., linear metallocene polyethylene (LLDPE))
"UE320" (NOVATEC PE (trade name), manufactured by Japan Polyethylene Corporation, linear low-density polyethylene (LLDPE))
(Ethylene-Vinyl Acetate Copolymer: EVA)
"V5274" (EVAFLEX V5274 (trade name), ethylene-vinyl acetate copolymer resin, content of VA: 17 mass %, manufactured by Dupont-Mitsui Polychemicals Co., Ltd.)
(Polypropylene: PP)
"PB222A" (trade name, manufactured by SunAllomer Ltd., random polypropylene)
(Ethlylene Propylene Diene Rubber: EPDM)
"NORDEL IP-4760P" (trade name, manufactured by Dow Chemical Japan Ltd.)
"NORDEL IP-4520P" (trade name, manufactured by Dow Chemical Japan Ltd.)
(Styrene-Based Elastomer: SEPS)
"SEPTON 4077" (trade name, manufactured by Kuraray Co., Ltd., SEPS, content of styrene: 30 mass %)
(OIL)
"DIANA PROCESS OIL PW-90" (trade name, manufactured by Idemitsu Kosan Co., Ltd., paraffin oil)
<Silica>
"Aerosil 200" (trade name, manufactured by Japan Aerosil corporation, hydrophilic fumed silica, amorphous silica, BET specific surface area Yi: 200 m$^2$/g)
"CRYSTALITE 5X" (trade name, manufactured by Tatsumori Ltd., crystalline silica, BET specific surface area Yi: 12 m$^2$/g)
"AEROSIL 90" (trade name, manufactured by Japan Aerosil corporation, hydrophilic fumed silica, amorphous silica, BET specific surface area Yi: 90 m$^2$/g)
"AEROSIL OX50" (trade name, manufactured by Japan Aerosil corporation, hydrophilic fumed silica, amorphous silica, BET specific surface area Yi: 50 m$^2$/g)
"SFP-20M" (trade name, manufactured by Denka Company Limited, crystalline silica, BET specific surface area Yi: 11.3 m$^2$/g)

"SFP-30M" (trade name, manufactured by Denka Company Limited, crystalline silica, BET specific surface area Yi: 6.2 m²/g)
<Inorganic Filler Other than Silica>
(Calcium Carbonate)
"Softon 1200" (trade name, manufactured by BIHOKU FUNKA KOGYO CO., LTD., BET specific surface area Yi: 1.2 m²/g)
"Softon 2200" (trade name, manufactured by BIHOKU FUNKA KOGYO CO., LTD., BET specific surface area Yi: 2.2 m²/g)
(Magnesium Hydroxide)
"MAGSEEDS X-6" (trade name, manufactured by Konoshima Chemical Co., Ltd.), BET specific surface area Yi: 5 m²/g)
"MAGSEEDS X-6F] (trade name, manufactured by Konoshima Chemical Co., Ltd., BET specific surface area Yi: 8 m²/g)
"KISUMA 5L" (trade name, manufactured by Kyowa Chemical Industry Co., Ltd., BET specific surface area Yi: 5.8 m²/g)
(Aluminium Hydroxide)
"Higilite H42M" (trade name, manufactured by SHOWA DENKO K.K., BET specific surface area Yi: 5 m²/g)
(Aluminium Oxide Monohydrate)
"Boehmite" (trade name, manufactured by Konoshima Chemical Co., Ltd., BET specific surface area Yi: 5 m²/g)
(Talc)
"k-1 talc" (trade name, manufactured by Nippon Talc Co., Ltd., BET specific surface area Yi: 7 m²/g)
<Silane Coupling Agent>
"KBM1003" (trade name, manufactured by Shin-Etsu Chemical Co., Ltd., Vinyltrimethoxysilane)
<Organic Peroxide>
"PERHEXA 25B" (trade name, manufactured by NOF CORPORATION, 2,5-dimethyl-2,5-di(tert-butylperoxy) hexane, temperature of decomposition: 149° C.)
<Silanol Condensation Catalyst>
"ADKSTAB OT-1" (trade name, manufactured by ADEKA CORPORATION, dioctyltin dilaurate)
<Antioxidizing Agent>
"IRGANOX 1010" (trade name, manufactured by BASF, pentaerythritol tetrakis [3-(3,5-di-tert-butyl-4-hydroxyphenyl)propionate])

Examples 1 to 33 and Comparative Examples 1 to 6

In each Example, part of a polyolefin-based resin (25 parts by mass based on a total amount of the polyolefin-based resin) was used as a carrier resin of a crosslinking promotion master batch (may be referred to as a crosslinking promotion MB in several cases). As this carrier resin, polyethylene "UE320" being one of resin components which constitute the polyolefin-based resin was applied.

First, with regard to Examples and Comparative Examples each excluding Examples 2, 3, 5, 7, 11, 13 and 17, an inorganic filler, a silane coupling agent and organic peroxide were dry-blended at room temperature (25° C.) for 3 minutes in blending proportions shown in a column "composition P (composition of silane master batch)" in Table 1 to Table 5 each.

Next, the mixture obtained and remaining components shown in the column "composition P" in Table 1 to Table 5 each were charged into a 2 L Banbury mixer manufactured by Nippon Roll MFG. Co. Ltd. in blending proportions shown in the column "composition P" in Table 1 to Table 5 each. A silane master batch (may be referred to as a silane MB in several cases) was obtained by kneading the resultant mixture at a revolution speed of 35 rpm for about 12 minutes by using this mixer, and then discharging the resultant material therefrom at a material discharge temperature of 180 to 190° C.

With regard to Examples 2, 3, 5 and 7 each, all components shown in a column "composition P" in Table 1 were charged into a 2 L Banbury mixer manufactured by Nippon Roll MFG. Co. Ltd. in blending proportions shown in a column "composition P" in Table 1. A silane MB was obtained by idling this mixer for 2 minutes, and then kneading the resultant mixture for about 12 minutes, and then discharging the resultant material therefrom at a material discharge temperature of 180 to 190° C.

With regard to Examples 11, 13 and 17, first, a silane coupling agent and organic peroxide were mixed at room temperature (25° C.) in blending proportions shown in a column "composition P" in Table 2 and Table 3 each. Then, a polyolefin-based resin, an inorganic filler and an antioxidant were charged into a 2 L Banbury mixer manufactured by Nippon Roll MFG. Co. Ltd., and then a blend of the silane coupling agent and the organic peroxide was put into the mixer. Then, a silane MB was obtained by mixing the charged components at room temperature (25° C.) in the Banbury mixer, followed by melting and mixing the resultant material at a material discharge temperature of 180° C. to 190° C. and at a revolution speed of 35 rpm for about 15 minutes.

The silane MB obtained in the Examples 1 to 33 contains at least two kinds of silane crosslinkable resins in which silane coupling agents were graft reacted onto the polyolefin-based resin.

The column "composition P" in Table 1 to Table 5 each shows, in addition to the blending amount of each component, an X value specified by Formula (I), and the like.

Next, the components shown in the column "composition Q (crosslinking promotion MB) in Table 1 to Table 5 each were mixed by the Banbury mixer in blending proportions shown in the column "composition Q" in Table 1 to Table 5 each, and then melt and mixed the resultant material at a material discharge temperature of 180 to 190° C., and thus the crosslinking promotion MB was obtained.

Next, the silane MB and the crosslinking promotion MB were dry-blended in blending proportions shown in a column "mixing ratio" in Table 1 to Table 5 each, and the resultant blend was introduced into a 40 mm extruder in which L/D=24 (a compression zone screw temperature: 190° C., a head temperature: 200° C.), and while the blend was melted and mixed in an extruder screw, was molded into two kinds of sheet-shaped molded bodies each having a thickness of 1 mm and 2 mm by T-die extrusion.

Moreover, in a similar manner, an electric wire having an outer diameter of 2.8 mm was obtained by coating the silane MB and the crosslinking promotion MB at a thickness of 1 mm outside a 1/0.8 TA conductor by using the extruder.

The thus-obtained two kinds of the sheet-shaped molded bodies and the electric wire were allowed to stand for 24 hours under an atmosphere of a temperature of 60° C. and a humidity of 95%. Thus, sheets composed of the two kinds of crosslinked resin molded bodies, respectively, and an insulated wire having the crosslinked resin molded body as a coating were produced.

In addition, in all of the two kinds of sheets and the insulated wire produced in Comparative Example 1, the crosslinked resin molded bodies were foamed.

The sheets and the electric wires thus manufactured were subjected to the following evaluation, and the results thereof are shown in Tables 1 to 5.

<Mechanical Property>

A tensile test was conducted on the sheet having a thickness of 1 mm produced in each Example. This tensile test was conducted, based on JIS K 6723, by using a JIS No. 3 dumbbell test specimen prepared by punching the crosslinked resin molded body sheet. Tensile strength (MPa) and elongation (%) were measured by conducting the test at a measuring temperature of 25° C., a gauge length of 20 mm and a tensile speed of 20 mm/min.

A case where the tensile strength is 10 MPa or more is deemed to be passable in the present test, and a case where the elongation is 200% or more is deemed to be passable in the present test.

<Heating Deformation Test (Sheet)>

The following heating deformation test was conducted as heat resistance of the sheet composed of the crosslinked resin molded body. As this heating deformation test, a heating deformation ratio was measured on the sheet having a thickness of 2 mm, based on the "heating deformation test" specified in JIS K 6723, under conditions of a measuring temperature of 120° C. and a load of 5 N.

As an evaluation, a case where the heating deformation ratio is 40% or less is deemed to be passable in the present test, and a case where the ratio is over 40% is deemed to be not passable in the present test (expressed by "C" in Table 1 to Table 5).

In Table 1 to Table 5, with regard to the results of the heating deformation test of the sheet, the following evaluation symbols are simultaneously described in addition to the heating deformation ratios. As the evaluation symbols, a case where the heating deformation ratio is deemed to be not passable is expressed by "C," a case where the heating deformation ratio is over 35% and 40% or less is expressed by "B," a case where the heating deformation ratio is over 30% and 35% or less is expressed by "A," and a case where the heating deformation ratio is 30% or less is expressed by "AA."

<Heating Deformation Test (Electric Wire)>

The following heating deformation test was conducted as heat resistance of the electric wire composed of the crosslinked resin molded. In this heating deformation test, a reduction in thickness of the insulated wire was measured, based on JIS C 3005, under conditions of a measuring temperature of 120° C. and a load of 5 N.

As an evaluation, a case where the reduction ratio is 50% or less is deemed to be passable in the present test, and a case where the ratio is over 50% is deemed to be not passable in the present test In Table 1 to Table 5, with regard to the results of the heating deformation test of the electric wire, the following evaluation symbols are simultaneously described in addition to the reduction ratios. As the evaluation symbols, a case where the reduction ratio is deemed to be not passable is expressed by "C," a case where the reduction ratio is over 40% and 50% or less is expressed by "B," a case where the reduction ratio is over 35% and 40% or less is expressed by "A," and a case where the reduction ratio is 35% or less is expressed by "AA."

<Extrusion Appearance Characteristics of Insulated Wire>

Extrusion appearance characteristics of the insulated wire were evaluated by observing extrusion appearance upon producing the insulated wire. Specifically, upon extruding a melted mixture of silane MB and crosslinking promotion MB at a linear speed of 15 m/min in an extruder having a screw diameter of 30 mm, the insulated wire in which appearance was good (no aggregated substances or defects were observed with naked eyes) was taken as "A," the insulated wire in which appearance was relatively bad (aggregated substances or defects were observed with naked eyes but which insulated wire can be used) was taken as "B," and the insulated wire I in which the appearance was remarkably bad (in which a number of the aggregated substances or defects were observed with naked eyes and which insulated wire can't be used) was taken as "C." "A" and "B" are deemed to be passable in the present test.

TABLE 1

| | | | | Examples | | | | | | | |
|---|---|---|---|---|---|---|---|---|---|---|---|
| | | | | 1 | 2 | 3 | 4 | 5 | 6 | 7 | 8 |
| Composition P | Polyolefin-based resin | PE | EVOLUE SP0540F UE320 | 15 | 15 | 15 | 15 | 15 | 15 | 15 | 15 |
| | | EVA | V5274 | | | | | | | | |
| | | PP | PB222A | 5 | 5 | 5 | 5 | 5 | 5 | 5 | 5 |
| | | EPDM | NORDEL IP-4760P | 25 | | 25 | 25 | 25 | 25 | 25 | 25 |
| | | | NORDEL IP-4520P | 10 | | 10 | 10 | 10 | 10 | 10 | 10 |
| | | SEPS | SEPTON 4077 | | 30 | | | | | | |
| | | OIL | DIANA PROCESS PW-90 | 20 | 25 | 20 | 20 | 20 | 20 | 20 | 20 |
| | Silica | | Yi (m²/g) | | | | | | | | |
| | | | Aerosil 200 | 200 | 1 | 0.3 | 10 | 9 | 7 | 6.5 | |
| | | | CRYSTALITE 5X | 12 | | | | | | | 60 |
| | | | Aerosil 90 | 90 | | | | | | | |
| | | | Aerosil OX50 | 50 | | | | | | | |

TABLE 1-continued

|  |  |  |  | Examples | | | | | | | |
|---|---|---|---|---|---|---|---|---|---|---|---|
|  |  |  |  | 1 | 2 | 3 | 4 | 5 | 6 | 7 | 8 |
|  | Calcium carbonate | SFP-20M |  | 11.3 | | | | | | | |
|  |  | SFP-30M |  | 6.2 | | | | | | | |
|  |  | Softon 1200 |  | 1.2 | | | | | | | |
|  |  | Softon 2200 |  | 2.2 | | | | | | | |
|  | Magnesium hydroxide | MAGSEEDS X-6 |  |  | 5 | | | | | | |
|  |  | MAGSEEDS X-6F |  |  |  | 8 | | | | | |
|  |  | KISUMA 5L |  |  |  |  | 5.8 | | | | |
|  | Aluminum hydroxide | Higilite H42M |  |  |  |  |  | 5 | | | |
|  | Aluminum oxide | Boehmite |  |  |  |  |  |  | 5 | | |
|  | Talc | k-1 talc |  | 7 | | | | | | | 60 |
|  | Total blending amount of inorganic filler (parts by mass) |  |  | 1 | 0.3 | 10 | 9 | 7 | 6.5 | 60 | 60 |
|  | Silane coupling agent | KBM1003 |  | 6 | 8 | 2 | 3 | 3.2 | 4 | 6 | 6 |
|  | Organic peroxide | PERHEXA 25B |  | 0.1 | 0.1 | 0.1 | 0.1 | 0.1 | 0.2 | 0.1 | 0.1 |
|  | Antioxidizing agent | IRGANOX 1010 |  | 0.1 | 0.1 | 0.1 | 0.1 | 0.1 | 0.1 | 0.1 | 0.1 |
|  | Total (parts by mass) |  |  | 82.2 | 83.5 | 87.2 | 87.2 | 85.4 | 85.8 | 141.2 | 141.2 |
|  | Formula (I) | ΣA |  | 200 | 60 | 2000 | 1800 | 1400 | 1300 | 720 | 420 |
|  |  | X |  | 33.3 | 7.5 | 1000 | 600 | 437.5 | 325 | 120 | 70 |
| Composition Q | PE | UE320 |  | 25 | 25 | 25 | 25 | 25 | 25 | 25 | 25 |
|  | Silanol condensation catalyst | ADKSTAB OT-1 |  | 0.2 | 0.2 | 0.2 | 0.2 | 0.2 | 0.2 | 0.2 | 0.2 |
|  | Antioxidizing agent | IRGANOX 1010 |  | 1 | 1 | 1 | 1 | 1 | 1 | 1 | 1 |
|  | Total (parts by mass) |  |  | 26.2 | 26.2 | 26.2 | 26.2 | 26.2 | 26.2 | 26.2 | 26.2 |
| Mixing ratio | Composition P | Mixing amount (parts by mass) |  | 82.2 | 83.5 | 87.2 | 87.2 | 85.4 | 85.8 | 141.2 | 141.2 |
|  | Composition Q | Mixing amount (parts by mass) |  | 26.2 | 26.2 | 26.2 | 26.2 | 26.2 | 26.2 | 26.2 | 26.2 |
|  | Total |  |  | 108.4 | 109.7 | 113.4 | 113.4 | 111.6 | 112 | 167.4 | 167.4 |
| Evaluation of sheet | Tensile strength | Mpa |  | 18.2 | 15.3 | 18.1 | 18.1 | 18.1 | 18.4 | 15.4 | 12.6 |
|  | Elongation | % |  | 633 | 651 | 313 | 313 | 313 | 320 | 538 | 447 |
|  | Heating deformation test | Heating deformation ratio (%) |  | 17 | 31 | 39 | 33 | 28 | 19 | 11 | 10 |
|  |  | Evaluation symbol |  | AA | A | B | A | AA | AA | AA | AA |
| Evaluation of insulated wire | Extrusion appearance characteristics |  |  | A | B | A | A | A | A | A | A |
|  | Heating deformation test | Heating deformation ratio (%) |  | 25 | 37 | 49 | 36 | 31 | 27 | 21 | 18 |
|  |  | Evaluation symbol |  | AA | A | B | A | AA | AA | AA | AA |

TABLE 2

|  |  |  |  | Examples | | | | | | | |
|---|---|---|---|---|---|---|---|---|---|---|---|
|  |  |  |  | 9 | 10 | 11 | 12 | 13 | 14 | 15 | 16 |
| Compostion P | Polyolefin-based resin | PE | EVOLUE SP0540F | 15 | 15 | 15 | 15 | 15 | 15 | 15 | 15 |
|  |  |  | UE320 | | | | | | | | |
|  |  | EVA | V5274 | | | | | | | | |
|  |  | PP | PB222A | 5 | 5 | 5 | 5 | 5 | 5 | 5 | 5 |
|  |  | EPDM | NORDEL IP-4760P | 25 | 25 | 25 | 25 | 25 | 25 | 25 | |
|  |  |  | NORDEL IP-4520P | 10 | 10 | 10 | 10 | 10 | 10 | 10 | |

TABLE 2-continued

|  |  |  | Examples | | | | | | | |
|---|---|---|---|---|---|---|---|---|---|---|
|  |  |  | 9 | 10 | 11 | 12 | 13 | 14 | 15 | 16 |
|  | SEPS | SEPTON 4077 |  |  |  |  |  |  |  | 30 |
|  | OIL | DIANA PROCESS PW-90 | 20 | 20 | 20 | 20 | 20 | 20 | 20 | 25 |
| Silica | | Yi (m²/g) | | | | | | | | |
|  | Aerosil 200 | 200 |  |  |  |  |  |  |  |  |
|  | CRYSTALITE 5X | 12 |  |  |  |  |  |  |  |  |
|  | Aerosil 90 | 90 | 1 |  |  |  |  |  |  |  |
|  | Aerosil OX50 | 50 |  | 1 |  |  |  |  |  |  |
|  | SFP-20M | 11.3 |  |  | 60 |  |  |  |  |  |
|  | SFP-30M | 6.2 |  |  |  | 60 |  |  |  |  |
| Calcium carbonate | Softon 1200 | 1.2 |  |  |  |  |  |  |  | 60 |
|  | Softon 2200 | 2.2 |  |  |  |  | 60 | 30 | 120 |  |
| Magnesium hydroxide | MAGSEEDS X-6 | 5 |  |  |  |  |  |  |  |  |
|  | MAGSEEDS X-6F | 8 |  |  |  |  |  |  |  |  |
|  | KISUMA 5L | 5.8 |  |  |  |  |  |  |  |  |
| Aluminum hydroxide | Higilite H42M | 5 |  |  |  |  |  |  |  |  |
| Aluminum oxide | Boehmite | 5 |  |  |  |  |  |  |  |  |
| Talc | k-1 talc | 7 |  |  |  |  |  |  |  |  |
| | Total blending amount of inorganic filler (parts by mass) | | 1 | 1 | 60 | 60 | 60 | 30 | 120 | 60 |
| Silane coupling agent | KBM1003 | | 6 | 6 | 4 | 6 | 6 | 8 | 2 | 8 |
| Organic peroxide | PERHEXA 25B | | 0.1 | 0.1 | 0.1 | 0.07 | 0.1 | 0.1 | 0.1 | 0.1 |
| Antioxidizing agent | IRGANOX 1010 | | 0.1 | 0.1 | 0.1 | 0.1 | 0.1 | 0.1 | 0.1 | 0.1 |
| | Total (parts by mass) | | 82.2 | 82.2 | 139.2 | 141.17 | 141.2 | 113.2 | 197.2 | 143.2 |
| | Formula (I) | ΣA | 90 | 50 | 678 | 372 | 132 | 66 | 264 | 72 |
| | | X | 15 | 8.3 | 169.5 | 62 | 22 | 8.25 | 132 | 9 |
| Composition Q | PE | UE320 | 25 | 25 | 25 | 25 | 25 | 25 | 25 | 25 |
| | Silanol condensation catalyst | ADKSTAB OT-1 | 0.2 | 0.2 | 0.2 | 0.2 | 0.2 | 0.2 | 0.2 | 0.2 |
| | Antioxidizing agent | IRGANOX 1010 | 1 | 1 | 1 | 1 | 1 | 1 | 1 | 1 |
| | Total (parts by mass) | | 26.2 | 26.2 | 26.2 | 26.2 | 26.2 | 26.2 | 26.2 | 26.2 |
| Mixing ratio | Composition P | Mixing amount (parts by mass) | 82.2 | 82.2 | 139.2 | 141.17 | 141.2 | 113.2 | 197.2 | 143.2 |
| | Composition Q | Mixing amount (parts by mass) | 26.2 | 26.2 | 26.2 | 26.2 | 26.2 | 26.2 | 26.2 | 26.2 |
| | | Total | 108.4 | 108.4 | 165.4 | 167.37 | 167.4 | 139.4 | 223.4 | 169.4 |
| Evaluation of sheet | Tensile strength | Mpa | 17.2 | 16.3 | 16.9 | 18 | 14.1 | 15.4 | 10.3 | 14.6 |
| | Elongation | % | 592 | 645 | 550 | 534 | 563 | 589 | 341 | 420 |
| | Heating deformation test | Heating deformation ratio (%) | 20 | 31 | 13 | 18 | 26 | 21 | 29 | 31 |
| | | Evaluation symbol | AA | A | AA | AA | AA | AA | AA | A |
| Evaluation of insulated wire | Extrusion appearance characteristics | | A | A | A | A | A | A | A | A |
| | Heating deformation test | Heating deformation ratio (%) | 29 | 36 | 23 | 22 | 28 | 31 | 24 | 37 |
| | | Evaluation symbol | AA | A | AA | AA | AA | AA | AA | A |

TABLE 3

| | | | | Examples | | | | | | | |
|---|---|---|---|---|---|---|---|---|---|---|---|
| | | | | | 17 | 18 | 19 | 20 | 21 | 22 | 23 | 24 |
| Composition P | Polyolefin-based resin | PE | EVOLUE SP0540F | | 15 | 15 | 15 | 15 | 15 | 15 | 15 | |
| | | | UE320 | | | | | | | | | |
| | | EVA | V5274 | | | | | | | | | |
| | | PP | PB222A | | 5 | 5 | 5 | 5 | 5 | 5 | 5 | 20 |
| | | EPDM | NORDEL IP-4760P | | | | | | | | | |
| | | | NORDEL IP-4520P | | | | | | | | | |
| | | SEPS | SEPTON 4077 | | 30 | 30 | 30 | 30 | 30 | 30 | 30 | 30 |
| | | OIL | DIANA PROCESS PW-90 | | 25 | 25 | 25 | 25 | 25 | 25 | 25 | 25 |
| | Silica | | Yi (m²/g) | | | | | | | | | |
| | | Aerosil 200 | | 200 | | | | | | | | |
| | | CRYSTALITE 5X | | 12 | | | | | | | | |
| | | Aerosil 90 | | 90 | | | | | | | 1 | |
| | | Aerosil OX50 | | 50 | | | | | | | | |
| | | SFP-20M | | 11.3 | | | | | | | | |
| | | SFP-30M | | 6.2 | | | | | | | | |
| | Calcium carbonate | Softon 1200 | | 1.2 | | | | | | | | |
| | | Softon 2200 | | 2.2 | | | | | | | | 60 |
| | Magnesium hydroxide | MAGSEEDS X-6 | | 5 | 150 | | | | | | | |
| | | MAGSEEDS X-6F | | 8 | | 220 | 140 | | | 240 | | |
| | | KISUMA 5L | | 5.8 | | | 140 | | | | | |
| | Aluminum hydroxide | Higilite H42M | | 5 | | | | 100 | | | | |
| | Aluminum oxide | Boehmite | | 5 | | | | | 100 | | | |
| | Talc | k-1 talc | | 7 | | | | | | | | |
| | Total blending amount of inorganic filler (parts by mass) | | | | 150 | 220 | 280 | 100 | 100 | 240 | 1 | 60 |
| | Silane coupling agent | KBM1003 | | | 10 | 4 | 3 | 6 | 6 | 15 | 6 | 6 |
| | Organic peroxide | PERHEXA 25B | | | 0.1 | 0.1 | 0.1 | 0.1 | 0.1 | 0.1 | 0.05 | 0.5 |
| | Antioxidizing agent | IRGANOX 1010 | | | 0.1 | 0.1 | 0.1 | 0.1 | 0.1 | 0.1 | 0.1 | 0.1 |
| | Total (parts by mass) | | | | 235.2 | 299.2 | 358.2 | 181.2 | 181.2 | 330.2 | 82.15 | 141.6 |
| | Formula (I) | ΣA | | | 750 | 1760 | 1932 | 500 | 500 | 1920 | 90 | 132 |
| | | X | | | 75 | 440 | 644 | 83.3 | 83.3 | 128 | 15 | 22 |
| Composition Q | PE | UE320 | | | 25 | 25 | 25 | 25 | 25 | 25 | 25 | 25 |
| | Silanol condensation catalyst | ADKSTAB OT-1 | | | 0.2 | 0.2 | 0.2 | 0.2 | 0.2 | 0.2 | 0.2 | 0.2 |
| | Antioxidizing agent | IRGANOX 1010 | | | 1 | 1 | 1 | 1 | 1 | 1 | 1 | 1 |
| | Total (parts by mass) | | | | 26.2 | 26.2 | 26.2 | 26.2 | 26.2 | 26.2 | 26.2 | 26.2 |
| Mixing ratio | Composition P | Mixing amount (parts by mass) | | | 235.2 | 299.2 | 358.2 | 181.2 | 181.2 | 330.2 | 82.15 | 141.6 |
| | Composition Q | Mixing amount (parts by mass) | | | 26.2 | 26.2 | 26.2 | 26.2 | 26.2 | 26.2 | 26.2 | 26.2 |
| | Total | | | | 261.4 | 325.4 | 384.4 | 207.4 | 207.4 | 356.4 | 108.35 | 167.8 |
| Evaluation of sheet | Tensile strength | | Mpa | | 14.2 | 11.5 | 10.3 | 16.3 | 14.2 | 12.3 | 14.2 | 10.3 |
| | Elongation | | % | | 390 | 347 | 240 | 310 | 300 | 330 | 590 | 180 |
| | Heating deformation test | Heating deformation ratio (%) | | | 9 | 16 | 32 | 15 | 17 | 13 | 34 | 9 |
| | | Evaluation symbol | | | AA | AA | A | AA | AA | AA | A | AA |

TABLE 3-continued

|  |  | Examples |  |  |  |  |  |  |  |
|---|---|---|---|---|---|---|---|---|---|
|  |  | 17 | 18 | 19 | 20 | 21 | 22 | 23 | 24 |
| Evaluation of insulated wire | Extrusion appearance characteristics | A | A | A | A | A | A | A | B |
|  | Heating deformation test | Heating deformation ratio (%) | 16 | 26 | 37 | 25 | 26 | 21 | 45 | 12 |
|  |  | Evaluation symbol | AA | AA | A | AA | AA | AA | B | AA |

TABLE 4

|  |  |  |  | Examples |  |  |  |  |  |  |  |  |
|---|---|---|---|---|---|---|---|---|---|---|---|---|
|  |  |  |  | 25 | 26 | 27 | 28 | 29 | 30 | 31 | 32 | 33 |
| Composition P | Polyolefin-based resin | PE | EVOLVE SP0540F | 10 | 10 | 10 | 15 | 15 | 15 | 55 | 55 | 35 |
|  |  |  | UE320 |  | 20 |  |  |  |  |  |  |  |
|  |  | EVA | V5274 |  |  | 20 |  |  |  |  |  | 20 |
|  |  | PP | PB222A | 10 |  |  | 5 | 5 | 5 | 20 | 20 | 20 |
|  |  | EPDM | NORDEL IP-4760P |  | 25 |  | 25 | 25 | 25 |  |  |  |
|  |  |  | NORDEL IP-4520P |  |  |  |  | 10 | 10 | 10 |  |  |
|  |  | SEPS | SEPTON 4077 | 30 |  | 30 |  |  |  |  |  |  |
|  |  | OIL | DIANA PROCESS PW-90 | 25 | 20 | 15 | 20 | 20 | 20 |  |  |  |
|  | Silica | Yi (m²/g) |  |  |  |  |  |  |  |  |  |  |
|  |  | Aerosil 200 | 200 |  | 1 | 3 | 1 | 1 | 1 | 0.8 |  |  |
|  |  | CRYSTALITE 5X | 12 |  |  |  |  |  |  |  |  |  |
|  |  | Aerosil 90 | 90 |  |  |  |  |  |  |  |  |  |
|  |  | Aerosil OX50 | 50 |  |  |  |  |  |  |  |  |  |
|  |  | SFP-20M | 11.3 |  |  |  |  |  |  |  |  |  |
|  |  | SFP-30M | 6.2 |  |  |  |  |  |  |  |  |  |
|  | Calcium carbonate | Softon 1200 | 1.2 |  |  |  |  |  |  |  |  |  |
|  |  | Softon 2200 | 2.2 |  |  |  |  | 60 |  |  |  |  |
|  | Magnesium hydroxide | MAGSEEDS X-6 | 5 | 150 |  |  |  |  |  |  |  |  |
|  |  | MAGSEEDS X-6F | 8 |  |  |  |  |  |  |  |  |  |
|  |  | KISUMA 5L | 5.8 |  |  |  |  | 120 |  |  | 100 | 100 |
|  | Aluminum hydroxide | Higilite H42M | 5 |  |  |  |  |  |  | 80 |  |  |
|  | Aluminum oxide | Boehmite | 5 |  |  |  |  |  |  |  |  |  |
|  | Talc | k-1 talc | 7 |  |  |  |  |  |  |  |  |  |
|  | Total blending amount of inorganic filler (parts by mass) |  |  | 150 | 1 | 3 | 61 | 121 | 81 | 0.8 | 100 | 100 |
|  | Silane coupling agent | KBM1003 |  | 10 | 6 | 6 | 6 | 6 | 6 | 3 | 5 | 6 |
|  | Organic peroxide | PERHEXA 25B |  | 0.1 | 0.1 | 0.1 | 0.1 | 0.1 | 0.1 | 0.1 | 0.1 | 0.1 |
|  | Antioxidizing agent | IRGANOX 1010 |  | 0.1 | 0.1 | 0.1 | 0.1 | 0.1 | 0.1 | 0.1 | 0.1 | 0.1 |
|  | Total (parts by mass) |  |  | 235.2 | 82.2 | 84.2 | 142.2 | 202.2 | 162.2 | 79 | 180.2 | 181.2 |
|  | Formula (I) | ΣA |  | 750 | 200 | 600 | 332 | 896 | 600 | 160 | 580 | 580 |
|  |  | X |  | 75 | 33.3 | 100 | 55.3 | 149.3 | 100 | 53.3 | 116 | 96.7 |

TABLE 4-continued

| | | | Examples | | | | | | | | |
|---|---|---|---|---|---|---|---|---|---|---|---|
| | | | 25 | 26 | 27 | 28 | 29 | 30 | 31 | 32 | 33 |
| Compostion Q | PE | UE320 | 25 | 25 | 25 | 25 | 25 | 25 | 25 | 25 | 25 |
| | Silanol condensation catalyst | ADKSTAB OT-1 | 0.5 | 0.2 | 0.2 | 0.2 | 0.2 | 0.2 | 0.2 | 0.2 | 0.2 |
| | Antioxidizing agent | IRGANOX 1010 | 1 | 1 | 1 | 1 | 1 | 1 | 1 | 1 | 1 |
| | Total (parts by mass) | | 26.5 | 26.2 | 26.2 | 26.2 | 26.2 | 26.2 | 26.2 | 26.2 | 26.2 |
| Mixing ratio | Composition P | Mixing amount (parts by mass) | 235.2 | 82.2 | 84.2 | 142.2 | 202.2 | 162.2 | 79 | 180.2 | 181.2 |
| | Composition Q | Mixing amount (parts by mass) | 26.5 | 26.2 | 26.2 | 26.2 | 26.2 | 26.2 | 26.2 | 26.2 | 26.2 |
| | Total | | 261.7 | 108.4 | 110.4 | 168.4 | 228.4 | 188.4 | 105.2 | 206.4 | 207.4 |
| Evaluation of sheet | Tensile strength | Mpa | 13.2 | 15.4 | 13.2 | 15.1 | 11.3 | 16.5 | 19.8 | 15.9 | 14.2 |
| | Elongation | % | 300 | 442 | 391 | 529 | 375 | 320 | 380 | 323 | 240 |
| | Heating deformation test | Heating deformation ratio (%) | 11 | 19 | 11 | 9 | 14 | 10 | 7 | 9 | 10 |
| | | Evaluation symbol | AA | AA | AA | AA | AA | AA | AA | AA | AA |
| Evaluation of insulated wire | Extrusion appearance characteristics | | A | A | A | A | A | A | A | A | A |
| | Heating deformation test | Heating deformation ratio (%) | 19 | 26 | 21 | 16 | 21 | 21 | 13 | 11 | 12 |
| | | Evaluation symbol | AA | AA | AA | AA | AA | AA | AA | AA | AA |

TABLE 5

| | | | | Comparative Examples | | | | | |
|---|---|---|---|---|---|---|---|---|---|
| | | | | 1 | 2 | 3 | 4 | 5 | 6 |
| Composition P | Polyolefin-based resin | PE | EVOLUE SP0540F | 15 | 15 | 15 | 15 | 15 | 15 |
| | | | UE320 | | | | | | |
| | | EVA | V5274 | | | | | | |
| | | PP | PB222A | 5 | 5 | 5 | 5 | 5 | 5 |
| | | EPDM | NORDEL IP-4760P | | | | | | 25 |
| | | | NORDEL IP-4520P | | | | | | 10 |
| | | SEPS | SEPTON 4077 | 30 | 30 | 30 | 30 | 30 | |
| | | OIL | DIANA PROCESS PW-90 | 25 | 25 | 25 | 25 | 25 | 20 |
| | Silica | | Yi (m²/g) | | | | | | |
| | | | Aerosil 200 | 200 | 0.25 | 12 | | | 12 |
| | | | CRYSTALITE 5X | 12 | | | | | |
| | | | Aerosil 90 | 90 | | | | | |
| | | | Aerosil OX50 | 50 | | | | | |
| | | | SFP-20M | 11.3 | | | | | |
| | | | SFP-30M | 6.2 | | | | | |
| | Calcium carbonate | | Softon 1200 | 1.2 | | | | 30 | |
| | | | Softon 2200 | 2.2 | | 100 | | | |
| | Magnesium hydroxide | | MAGSEEDS X-6 | 5 | | | | | |
| | | | MAGSEEDS X-6F | 8 | | | | | |
| | | | KISUMA 5L | 5.8 | | | 330 | 200 | |

TABLE 5-continued

|  |  |  | Comparative Examples | | | | | |
|---|---|---|---|---|---|---|---|---|
|  |  |  | 1 | 2 | 3 | 4 | 5 | 6 |
|  | Aluminum hydroxide | Higilite H42M | 5 |  |  |  |  |  |
|  | Aluminum oxide | Boehmite |  |  |  |  | 5 |  |
|  | Talc | k-1 talc |  |  |  |  |  | 7 |
|  | Total blending amount of inorganic filler (parts by mass) |  | 0.25 | 112 | 330 | 200 | 30 | 12 |
|  | Silane coupling agent | KBM1003 | 11 | 2 | 2 | 1 | 8 | 2 |
|  | Organic peroxide | PERHEXA 25B | 0.1 | 0.1 | 0.1 | 0.1 | 0.1 | 0.1 |
|  | Antioxidizing agent | IRGANOX 101 | 0.1 | 0.1 | 0.1 | 0.1 | 0.1 | 0.1 |
|  | Total (parts by mass) |  | 86.45 | 189.2 | 407.2 | 276.2 | 113.2 | 89.2 |
|  | Formula (I) | ΣA | 50 | 2620 | 1914 | 1160 | 36 | 2400 |
|  |  | X | 4.5 | 1310 | 957 | 1160 | 4.5 | 1200 |
| Composition Q | PE | UE320 | 25 | 25 | 25 | 25 | 25 | 25 |
|  | Silanol condensation catalyst | ADKSTAB OT-1 | 0.2 | 0.2 | 0.2 | 0.2 | 0.2 | 0.2 |
|  | Antioxidizing agent | IRGANOX 1010 | 1 | 1 | 1 | 1 | 1 | 1 |
|  | Total (parts by mass) |  | 26.2 | 26.2 | 26.2 | 26.2 | 26.2 | 26.2 |
| Mixing ratio | Composition P | Mixing amount (parts by mass) | 86.45 | 189.2 | 407.2 | 276.2 | 113.2 | 89.2 |
|  | Composition Q | Mixing amount (parts by mass) | 26.2 | 26.2 | 26.2 | 26.2 | 26.2 | 26.2 |
|  |  | Total | 112.65 | 215.4 | 433.4 | 302.4 | 139.4 | 115.4 |
| Evaluation of sheet | Tensile strength | Mpa | 9.7 | 7.2 | 8.3 | 11.1 | 14.2 | 18.1 |
|  | Elongation | % | 330 | 240 | 100 | 273 | 300 | 313 |
|  | Heating deformation test | Heating deformation ratio (%) | 44 | 72 | 64 | 79 | 42 | 48 |
|  |  | Evaluation symbol | C (foramed) | C | C | C | C | C |
| Evaluation of insulated wire | Extrusion appearance characteristics |  | C | C | A | A | C | A |
|  | Heating deformation test | Heating deformation ratio (%) | 52 | 78 | 83 | 74 | 58 | 62 |
|  |  | Evaluation symbol | C (foramed) | C | C | C | C | C |

The following is found from the results in Table 1 to Table 5.

According to all of Examples 1 to 33, the sheet composed of the crosslinked resin molded body and having a combination of excellent appearance, mechanical characteristics, and heat resistance, and the insulated wire having the coating composed of this crosslinked resin molded body could be produced. Moreover, in a case where the inorganic filler and the silane coupling agent were simultaneously used in such a manner that the X value specified by Formula (I) falls within the above-described preferable range, the heat resistance could be further improved without adversely affecting all of the appearance and the mechanical characteristics of the crosslinked resin molded body. Further, according to Examples 1 to 33, the crosslinkable resin composition and the silane master batch each having a capability of producing the crosslinked resin molded body having the combination of the excellent appearance, mechanical characteristics, and heat resistance could be prepared.

In contrast, in Comparative Examples 1 and 5 in which the X value specified by Formula (I) was too small, at least the heating deformation test and the extrusion appearance characteristics were deemed to be not passable. Further, in Comparative Examples 2, 4 and 6 in which the X value specified by Formula (I) was too large, at least the heating deformation test was deemed to be not passable. Further, in Comparative Example 3 in which the blending amount of the inorganic filler was too large, the mechanical characteristics and the heating deformation test were deemed to be not passable.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of producing a crosslinked resin molded body, the method comprising:
   (1) mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin comprising a styrene-based elastomer, to obtain a mixture;

(2) molding the mixture obtained in (1) to obtain a molded body; and (3) contacting the molded body obtained in (2) with water, to obtain a crosslinked resin molded body, wherein:

the mixing (1) comprises:

(a) mixing the organic peroxide, the inorganic filler in which an X value specified by Formula (I) satisfies 5 to 1050, and the silane coupling agent, to obtain a mixture (a):

$$X = \Sigma A/B \tag{I}$$

in which:

$\Sigma A$ denotes a total amount of a product of a BET specific surface area (m$^2$/g) of the inorganic filler and a blending amount of the inorganic filler, and B denotes a blending amount of the silane coupling agent;

(b) melting and mixing the mixture (a) with a whole or part of the polyolefin-based resin at a temperature equal to or higher than a decomposition temperature of the organic peroxide, to obtain a melted mixture (b);

(c) mixing the silanol condensation catalyst with, as a carrier resin, a resin different from the polyolefin-based resin or a remaining portion of the polyolefin-based resin, to obtain a mixture (c); and (d) mixing the melted mixture (b) with the mixture (c).

2. The method of claim 1, wherein a mixing amount of the silane coupling agent is more than 4 parts by mass and 15.0 parts by mass or less, with respect to 100 parts by mass of the polyolefin-based resin.

3. The method of claim 1, wherein the silane coupling agent is vinyltrimethoxysilane or vinyltriethoxysilane.

4. The method of claim 1, wherein the inorganic filler is at least one selected from the group consisting of silica, aluminum hydroxide, magnesium hydroxide, calcium carbonate, magnesium carbonate, kaolin, zinc borate, zinc hydroxystannate, and talc.

5. A method of producing a crosslinkable resin composition, the method comprising mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin comprising a styrene-based elastomer, said mixing comprising:

(a) mixing the organic peroxide, the inorganic filler in which an X value specified by Formula (I) satisfies 5 to 1050, and the silane coupling agent, to obtain a mixture (a):

$$X = \Sigma A/B \tag{I}$$

wherein:

$\Sigma A$ denotes a total amount of a product of a BET specific surface area (m$^2$/g) of the inorganic filler and a blending amount of the inorganic filler, and B denotes a blending amount of the silane coupling agent;

(b) melting and mixing the mixture (a) with a whole or part of the polyolefin-based resin at a temperature equal to or higher than a decomposition temperature of the organic peroxide, to obtain a melted mixture (b);

(c) mixing the silanol condensation catalyst with, as a carrier resin, a resin different from the polyolefin-based resin or a retraining portion of the polyolefin-based resin, to obtain a mixture (c); and (d) mixing the melted mixture (b) with the mixture (c).

6. A crosslinkable resin composition produced by the method of claim 5.

7. A crosslinked resin molded body produced by the method of claim 1.

8. A molded article, comprising the crosslinked resin molded body of claim 7.

9. A silane master batch used for producing a crosslinkable resin composition prepared by mixing 0.02 to 0.6 parts by mass of an organic peroxide, 0.2 to 300 parts by mass of an inorganic filler, 2 to 15.0 parts by mass of a silane coupling agent, and a silanol condensation catalyst, based on 100 parts by mass of a polyolefin-based resin comprising a styrene-based elastomer, wherein the silane master batch is prepared through the following steps (a) and (b):

(a) mixing the organic peroxide, the inorganic filler in which an X value specified by Formula (I) satisfies 5 to 1050, and the silane coupling agent, to obtain a mixture (a)

$$X = \Sigma A/B \tag{I}$$

wherein, $\Sigma A$ denotes a total amount of a product of a BET specific surface area (m$^2$/g) of the inorganic filler and a blending amount of the inorganic filler, and B denotes a blending amount of the silane coupling agent; and (b) melting and mixing the mixture (a) with a whole or part of the polyolefin-based resin at a temperature equal to or higher than a decomposition temperature of the organic peroxide.

* * * * *